Nov. 17, 1959 F. CORDERO 2,913,008
NONLINEAR SENSITIVE DIAPHRAGM
Filed Nov. 21, 1957 4 Sheets-Sheet 1

INVENTOR
Fidel Cordero
BY
ATTORNEYS

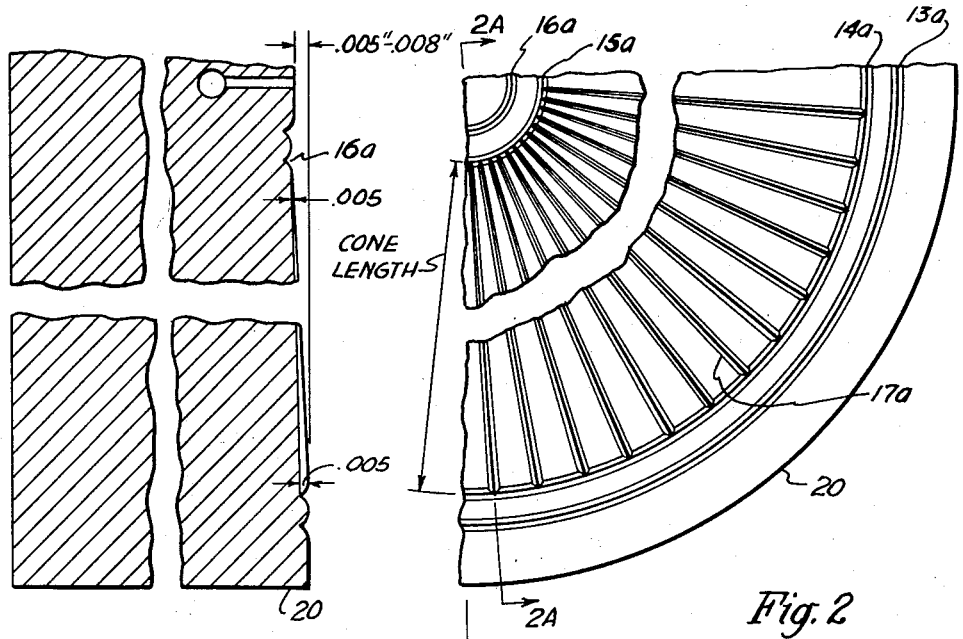
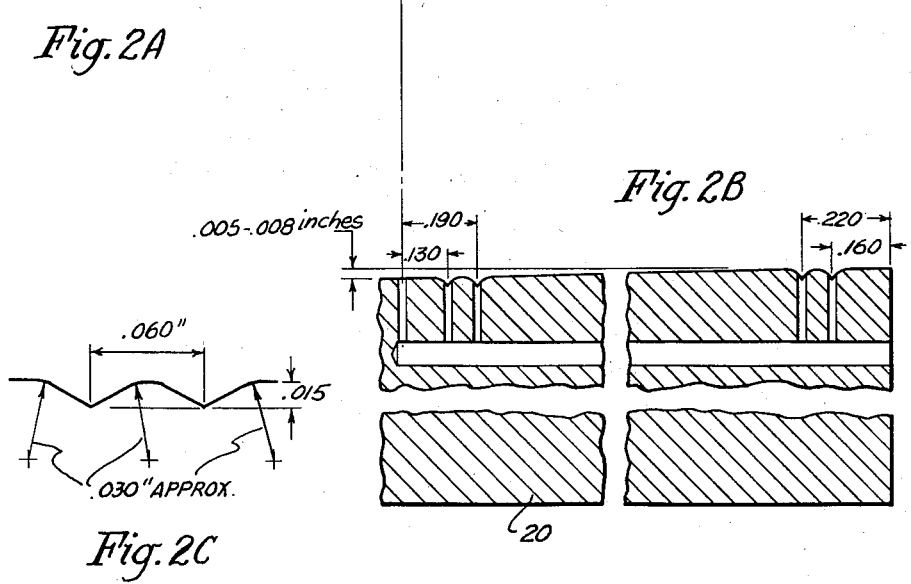
Fig. 2A    Fig. 2    Fig. 2B    Fig. 2C

Nov. 17, 1959  F. CORDERO  2,913,008
NONLINEAR SENSITIVE DIAPHRAGM
Filed Nov. 21, 1957  4 Sheets-Sheet 3

INVENTOR
Fidel Cordero
BY Arthur Vinograd
Leonard K. Stoll
ATTORNEYS

United States Patent Office 2,913,008
Patented Nov. 17, 1959

2,913,008

NONLINEAR SENSITIVE DIAPHRAGM

Fidel Cordero, Washington, D.C., assignor to the United States of America as represented by the Secretary of Commerce Application November 21, 1957, Serial No. 698,017

4 Claims. (Cl. 137—793)

This invention relates to the art of diaphragm construction and particularly contemplates a diaphragm having a displacement characteristic nonlinearly related to the applied pressure. There are many instances in which the need for a diaphragm having a nonlinear displacement characteristic is desirable. In connection with a Wien bridge oscillator, for example, it has been found that a transducer employing the diaphragm of the present invention as the movable element, and incorporated as the frequency determining element of the bridge will provide an output frequency which is linear over a range of plus or minus 30 dynes per cm.$^2$.

In accordance with the principles of the present invention, the diaphragm has a controlled predetermined nonlinear pressure deflection characteristic. By varying the dimensions of the diaphragm as will be described, moreover, the degree of nonlinearity can be controlled or tailored to fit a particular application.

In one exemplary embodiment for example, the diaphragm of the present invention has a pressure-deflection characteristic such that, when employed as the moving element of a capacitive transducer comprising the frequency controlling circuit of a Wien bridge oscillator, the frequency deviation of the oscillator will be proportioned to the pressure difference across the diaphragm.

It can be shown that in a Wien bridge oscillator, the frequency-capacity relation defining the variation of one capacitor is $$f \approx C^{-\frac{1}{2}}$$

In an ideal parallel plate capacitor type of transducer, the desired pressure displacement relation over the working range of the diaphragm is $$p \sim d^{\frac{1}{2}}$$

Such inverse relationship between capacities and plate separation in a physically realizable condenser necessitates empirical adjustment of the diaphragm configuration to obtain the required characteristic. The present invention provides a specific diaphragm configuration which results in the desired degree of conformity between the pressure and frequency characteristics.

It is accordingly an immediate object of the present invention to provide a diaphragm having an output displacement which is nonlinearly related to the pressure applied to the diaphragm.

Another object of the present invention is to provide an improved diaphragm for use as the moving element of a condenser-type transducer, the pressure response characteristic of the diaphragm having a predetermined relation to the frequency response characteristic of a Wien bridge oscillator incorporating such transducer as the frequency determining element in its circuit.

Still another object of this invention is to provide an improved diaphragm which has a sensitive capacity response in response to applied pressure changes.

A still further object of this invention is to provide a capacitor-type transducer the moving element of which is a diaphragm having a controlled pressure deflection characteristic such that when employed as the frequency determining element of a Wien bridge oscillator, a linear frequency derivation will be obtained over a wide range of applied pressures.

It is a still further object of this invention to provide an improved diaphragm which has excellent long-time stability.

A further object of this invention is to provide an improved diaphragm which can withstand momentary overpressures in the order of per cm.$^2$ of 30 times the linear output range.

Other uses and advantages of the invention will become apparent upon reference to the specification and drawings in which, Fig. 1A is a plan view of the diaphragm comprising the present invention;

Fig. 2 is a plan view of the die-matrix employed in forming the diaphragm of Figs. 1A and 1B;

Fig. 2A is a sectional view of the matrix taken on line 2A—2A of Fig. 2;

Fig. 2B is a sectional view of the matrix taken on line 2B—2B of Fig. 2;

Fig. 2C is a dimensional representation of the outline of the grooves and ridges formed in the surface of the die-matrix;

Figure 1A:
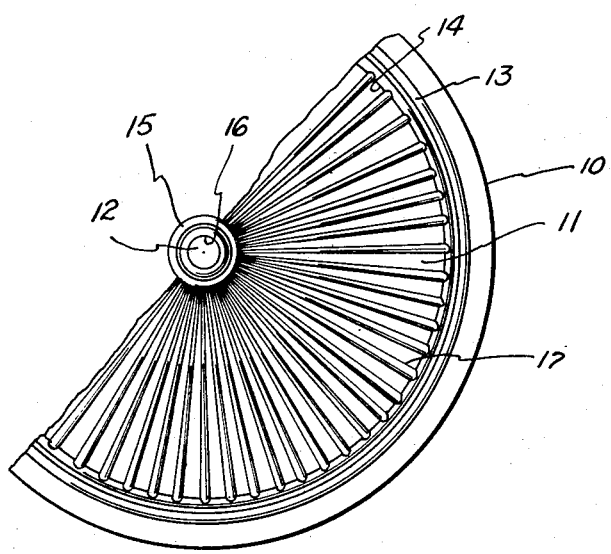
Fig. 1B is a side view partially in section of the diaphragm showing the configuration of the diaphragm in greatly exaggerated form.
Figure 1B:
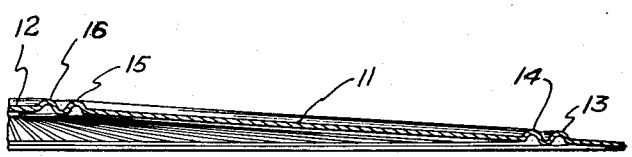

As is apparent from Figs. 1A and 1B the diaphragm comprises a peripheral portion or annular flange 10, an intermediate web portion 11, and a central or hub portion 12. The web portion 11 is delineated with respect to the peripheral and central portions by means of annular embossings, such as 13, 14, and 15, 16 respectively. Such embossings form corresponding grooves and ridges in the obverse surfaces of the diaphragm. These annular embossings, as is more apparent in Fig. 1B, provide essentially resilient connections joining the web portion 11 with the peripheral portion 10 and the central or hub portion 12, respectively. The web portion 11 is stiffened by the provision of a plurality of spoke-like or radially-arranged corrugations 17 in the form of embossings each of which extends between the inner peripheral embossing 15 and the outer annular embossing 14, as is quite clear from Fig. 1B.

In the process of forming the diaphragm, as will be subsequently described, the diaphragm is made slightly conical in shape as is more clearly indicated in Fig. 1B. Fig. 1B greatly exaggerates the degree of taper of the diaphragm for purposes of illustration. In actual practice the amount of taper given for a diaphragm having a 3½ inch diameter is approximately between 5 thousandths and 8 thousandths of an inch as will be made apparent when Figs. 2–2C are discussed. At this point in the description it will be apparent from Fig. 1B that the inner and outer embossments 13, 14, 15, and 16 provide respective resilient hinge-like connections between the web portion 11 of the diaphragm and the marginal portion 10 and hub portion 12. The web portion 11 being further stiffened by the provision of the referred-to radial grooves and ribs 17, results in a stiffened web displaceable relative to the rim portion 10 and the hub 12. The combined effect of the radial corrugations and the concavity of the diaphragm compels the diaphragm to execute an umbrella-like motion when pressure is applied. The diaphragm is more compliant when pressure is applied to its convex side than to its concave side.

The detailed construction of the diaphragm especially with regard to its dimensional configuration can best be illustrated by referring to the die-matrix employed in the fabrication of the diaphragm. The constructional details of the matrix or die are illustrated in Figs. 2–2C of the drawings. The embossing portions of the matrix are designated with reference numerals corresponding to the reference numerals designating the embossments in Figs. 1A–1B. Fig. 2 shows a portion of the face of the die. The inner annular grooves 15 and 16 and the outer grooves 13 and 14 of the diaphragm are formed by corresponding annular recesses 13a, 14a 15a, and 16a provided in the face of the matrix. Similarly, the radial corrugations 17 in the web portion of the diaphragm are embossed from a plurality of radially extending channels 17a provided in the face of the matrix as shown in Fig. 2.

Figure 5:
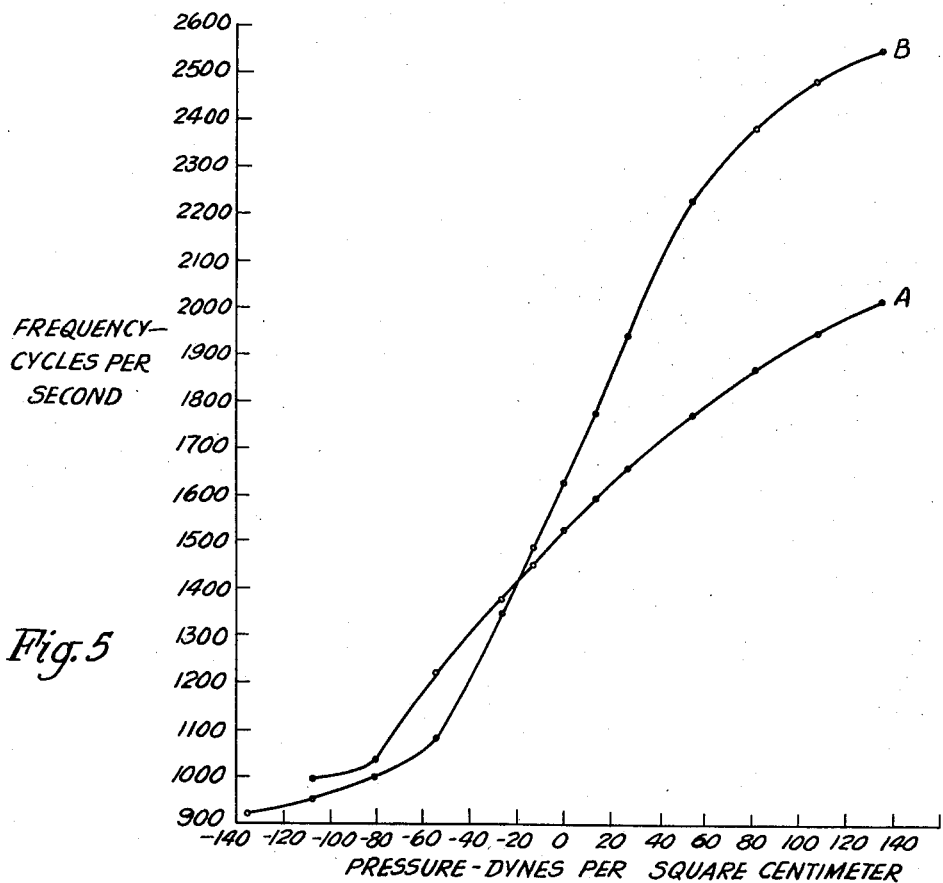
Figs. 5 and 6 are curves showing the pressure frequency response characteristic of the diaphragm of the present invention.
Figure 6:
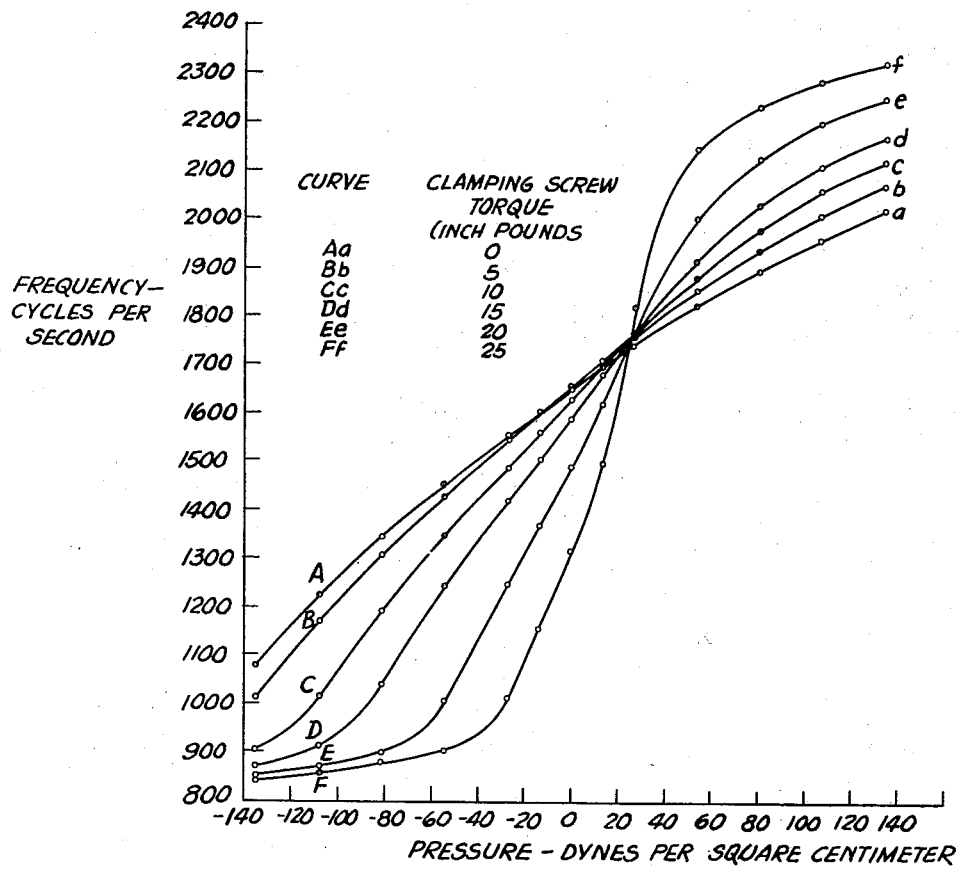

Figs. 2A and 2B dimensionally outline one embodiment of the invention designed to produce a particular output frequency response of the range indicated in Figs. 5 and 6 for purposes of illustration. The principles of diaphragm construction comprising the present invention are however not limited to any specific dimensional configuration. For example, the ratio between the thickness of the material employed can be varied in relationship to the diameter of the diaphragm. If the thickness is made proportionate to the diameter, the sensitivity of response is decreased but increased linearity of the output displacement relative to the applied pressure results. On the other hand, if the thickness of the material is decreased relative to the actual diameter, higher sensitivity with a decreased linear range of response is obtained. In the particular embodiment shown in the drawings a diaphragm thickness of 1 mil was employed.

Similarly, the dimensional configuration of the corrugation 11 as well as the annular embossment 13—16 can be varied depending on the particular response characteristics desired. It is only important that the described relationship between the web, hub, and the peripheral flange be preserved. So long as the web preserves its inherent stiffness as provided by the radial corrugations and the relation of such corrugations to the annular embossments 13—16, the diaphragm of the present invention will behave in a singular manner in response to applied pressures so that a controlled nonlinear deflection response is obtained.

In the illustrated embodiment, for a diaphragm diameter of approximately 4 inches, a radial spacing between corrugations of approximately 6 degrees was employed.

Regardless of the specific dimensions employed the deflection behaviour of the diaphragm in response to applied pressures conforms to the referred-to umbrella-like action. Regarding Figs. 1A and 1B it will be apparent that each sector of the diaphragm as defined by any two adjacent radial corrugations comprises together with the arcuate portions 13, 14 and 15, 16 a rigid surface. As compared to conventional diaphragms in which stresses are taken up by shearing action in the diaphragm material, each of the sectors according to the construction of the present invention, remains rigid, the radial corrugation and marginal embossments permitting displacement of the sectors as an integral unit.

The sectional views of the embossing matrix shown in Figs. 2A and 2B clearly indicate the degree of taper imparted to the diaphragm after it is embossed. Specifically, as dimensionally indicated in Figs. 2A and 2B, and diaphragm is given a conical shape having a taper of from 0.005 to 0.008 thousandths of an inch due to the offset of the inner portion of the matrix from the outer portion. Fig. 2A which is a section taken on line 2A—2A of Fig. 2 also indicates that each of the radially disposed corrugations 17 in the web portion of the diaphragm have a tapering depth extending from a maximum (0.015") adjacent the outer annular embossment 14 to a minimum adjacent the inner annular groove 15. The amount of conicalness given the diaphragm is, however, optimal. The degree of nonlinearity of response varies with the steepness of the cone. A steeper cone will give a greater degree of nonlinearity and vice versa.

Fig. 2C is a sectional view showing the outline produced when the matrix is originally inscribed. A sharp-pointed tool is used to form the depressions in the matrix die and it will be apparent from Fig. 2C that the bottoms of the grooves are therefore substantially V-shaped. The ridge portions of the matrix are preferably rounded to a radius of approximately 0.030" as indicated in Fig. 3C.

Figure 3:
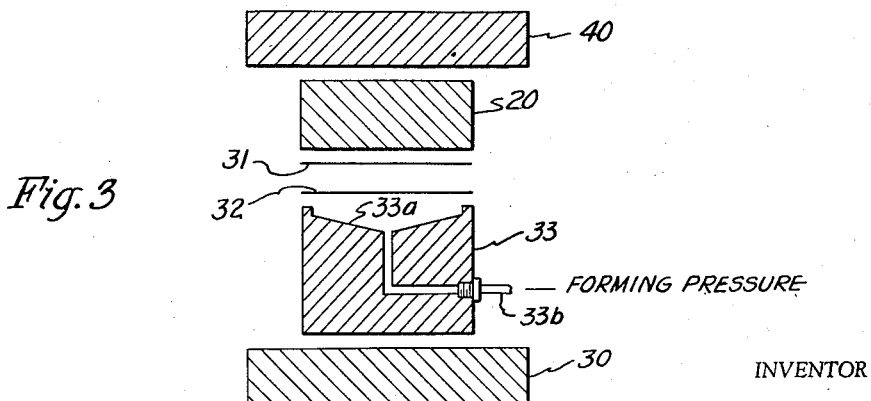
Fig. 3 is a diagrammatic illustration of the arrangement of the pressure apparatus employed in making the diaphragm of the present invention.

Fig. 3 is a diagrammatic representation of the mechanism used in embossing the diaphragm of the present invention. Hydraulic forming techniques may be employed. Fig. 3 shows the lower and upper platens 30, 40 of a hydraulic press in relation to the embossing matrix 20 of Fig. 2. The blank disc from which the diaphragm is formed is indicated as 31 in Fig. 3. The blanks comprise annealed brass shim-stock. A disc of paper or other fibrous material 32 is provided juxtaposed adjacent blank 31. The matrix base 33 is provided with a conical recess 33a and an inlet 33b which is connected to a conventional high-pressure fluid source. To form a diaphragm, the platens 40 and 30 are initially brought together in a hydraulic press, and the matrices and the blank 32 are clamped together with a force of approximately 10 tons. The clamping force is concentrated on the annular portion 10a of the matrices. The diaphragm 31 is securely held in such manner by the annular portion 10. The diaphragm is then formed by the application of fluid pressure applied through inlet 33b shown in Fig. 3, the fluid being applied at a pressure of approximately 1500 pounds per square inch, and held for several seconds.

After release of the forming pressure, the press is opened and the diaphragm carefully removed. The absence of oil on the face of the die indicates that there is no damage to the diaphragm during the forming process. Considering the shape of the grooves in the matrix as indicated in Fig. 2C in enlarged form it will be clear that the forming pressure causes the blank 31 to assume an arcuate shape with respect to the V-shaped bottoms of the grooves in the matrix. Accordingly, instead of a sharp rib being formed in the diaphragm, the resulting embossments have an arcuate cross section as indicated in Fig. 1B.

Figure 4:
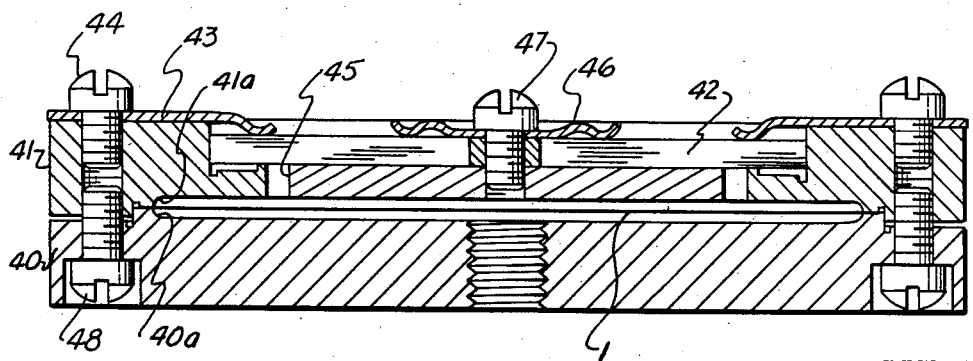
Fig. 4 shows the diaphragm of the present invention applied to a condenser-type transducer.

Fig. 4 illustrates one application of the diaphragm of this invention. The diaphragm is shown forming the moving element or plate of a capacitive-type transducer. As shown in Fig. 4, the transducer housing comprises two brass rings 40, 41, annular bosses 40a, 41a being machined on the obverse faces of each ring to form an annular clamping surface. The diaphragm 1 is mounted centrally of the rings as clearly indicated in Fig. 4, the marginal portion 10 thereof indicated in Fig. 1A being held by the referred-to clamping surfaces. A glass disc 42 is provided in a suitable recess formed in the clamping ring 41. The glass disc 42 is secured to the top ring 41 by means of clamping member 46 and an appropriate screw fastening 47. The second plate of the capacitor is formed by a disc 45 secured to the glass disc 42 by means of a screw fastening 47 and spring fingers 44. The screw fasteners 44, 47 provide suitable connecting points for electrically integrating the diaphragm and the disc 45 into a utilization circuit. Screw fastener 48 is provided to join the sections 40, 41 of the transducer. The fastener 48 also provides means for varying the tension and consequently the sensitivity of the diaphragm by the degree of pressure between clamping surfaces 40a, 41a.

Figs. 5 and 6 are characteristic showing the frequency vs. pressure response of the diaphragm when incorporated in a transducer of the type shown in Fig. 4 and applied as the frequency determining element of a Wien bridge oscillator. Fig. 5 shows the frequency response vs. applied pressure in a dynes per square centimeter for two different diaphragms labeled "A" and "B," respectively. It will be seen from Fig. 5 that each diaphragm exhibits substantially linear response characteristics over a range extending between approximately 1100 and 2200 c.p.s. over a pressure range between approximately −80 +80 dynes per centimeter. The effect of tensioning the diaphragm by the fastener 48 is exhibited in the characteristic curves of Fig. 6.

Fig. 6 shows the different frequency vs. pressure responses obtained from a diaphragm of the present invention when the clamping screws 48 have been adjusted to give different tensions to the diaphragm. It will be apparent from Fig. 6 that different clamping tensions result in different sensitivity of the diaphragm. Curve F$f$ indicates that a tension equivalent to the application of a twenty-five pound torque to the clamping screws results in the diaphragm having the highest sensitivity of response.

It will be apparent that the embodiments shown are only exemplary and that various modifications can be made in construction and arrangement within the scope of invention as defined in the appended claims.

What is claimed is:

1. A diaphragm for providing a controlled, nonlinear pressure deflection characteristic comprising a cone-shaped membrane having a marginal anchoring flange, a central hub portion and an intermediate web portion, means flexibly joining said web portion to said marginal flange and hub portions respectively, said flexible joining means comprising annular embossments formed in the membrane, said web portion having a plurality of radially arrayed corrugations formed in said membrane extending between and joining said annular embossments, the surfaces forming said corrugations being contiguous with the surfaces forming said annular embossments and defining together with said embossments a plurality of relatively rigid substantially flat sectors on said web portion flexibly interconnected by said corrugations, the application of pressure to said diaphragm resulting in displacement of said hub portion relative to said marginal flange in a manner such that each of said sectors is displaced as a substantially rigid body.

2. In a capacitive-type transducer for use as the frequency determining element of a Wien bridge oscillator, a diaphragm for providing a controlled nonlinear pressure deflection characteristic comprising a cone-shaped membrane having a marginal anchoring flange, a central hub portion and an intermediate web portion, means flexibly joining said web portion to said marginal flange and hub portions respectively, said flexible joining means comprising annular embossments formed in the membrane, said web portion having a plurality of radially arrayed corrugations formed in said membrane extending between and joining said annular embossments, the surfaces forming said corrugations being contiguous with the surfaces forming said annular embossments and defining together with said embossments a plurality of relatively rigid substantially flat sectors on said web portion flexibly interconnected by said corrugations, whereby the excursions of said hub portion relative to said marginal flange vary nonlinearly relative to the excursion providing pressures applied to the diaphragm.

3. The invention of claim 2 in which said diaphragm has a diameter of approximately four inches and said hub portion is offset with respect to said marginal flange portion in a direction perpendicular to the plane of said diaphragm by an amount of from 0.005 to 0.008 inches.

4. The invention of claim 3 in which said corrugations are spaced relative to each other at an arcuate angle of approximately 6 degrees.

References Cited in the file of this patent

UNITED STATES PATENTS

| | | |
|---|---|---|
| 1,921,312 | Eichholz | Aug. 8, 1933 |

FOREIGN PATENTS

| | | |
|---|---|---|
| 579,289 | Great Britain | July 30, 1946 |